US012806543B2

(12) United States Patent
Sabey et al.

(10) Patent No.: US 12,806,543 B2
(45) Date of Patent: Nov. 24, 2026

(54) CONTACT TOWER TRAY AND RELATED METHODS

(71) Applicant: Produced Water Absorbents Inc., Houston, TX (US)

(72) Inventors: John Sabey, Houston, TX (US); Yuecun (Terry) Lou, Houston, TX (US)

(73) Assignee: PRODUCED WATER ABSORBENTS, INC., Houston, TX (US)

( * ) Notice: Subject to any disclaimer, the term of this patent is extended or adjusted under 35 U.S.C. 154(b) by 337 days.

(21) Appl. No.: 18/240,487

(22) Filed: Aug. 31, 2023

(65) Prior Publication Data

US 2024/0075404 A1 Mar. 7, 2024

Related U.S. Application Data

(60) Provisional application No. 63/403,247, filed on Sep. 1, 2022.

(51) Int. Cl.
*B01F 23/21* (2022.01)
*B01D 3/26* (2006.01)
(Continued)

(52) U.S. Cl.
CPC ............... *B01D 3/26* (2013.01); *B01D 3/324* (2013.01); *B01D 53/18* (2013.01); *B01F 23/214* (2022.01);
(Continued)

(58) Field of Classification Search
CPC .... B01F 23/21; B01F 23/214; B01F 23/2321; B01F 23/2322
See application file for complete search history.

(56) References Cited

U.S. PATENT DOCUMENTS 1,233,557 A 7/1917 Curtis
2,361,150 A 10/1944 Petroe
(Continued)

FOREIGN PATENT DOCUMENTS

CN 104888486 A * 9/2015
CN 206027482 3/2017
(Continued)

OTHER PUBLICATIONS

International Search Report and Written Opinion issued in corresponding International Patent Application No. PCT/IB2023/058626 dated Nov. 30, 2023.
(Continued)

*Primary Examiner* — Robert A Hopkins
(74) *Attorney, Agent, or Firm* — Norton Rose Fulbright US LLP

(57) ABSTRACT

The present disclosure includes a mixing device for use in a contact tower. The mixing device can include a first tray defining multiple first openings and multiple mixers coupled to the first tray. Each mixer can include a first portion having a first sidewall and a second portion extending from the first portion, the second portion having a second sidewall. The first sidewall can define an inlet in communication with one of the first openings, an outlet, a convergent channel extending between the inlet and the outlet of the first sidewall, and an injection port extending through the first sidewall and positioned between the inlet and outlet of the first sidewall. The second sidewall can define an inlet in communication with the outlet of the first sidewall, an outlet, and a divergent channel extending between the inlet and the outlet of the second sidewall.

14 Claims, 6 Drawing Sheets

(51) Int. Cl.

| | |
|---|---|
| ***B01D 3/32*** | (2006.01) |
| ***B01D 53/18*** | (2006.01) |
| ***B01F 23/23*** | (2022.01) |
| ***B01F 23/232*** | (2022.01) |
| ***B01F 25/433*** | (2022.01) |

(52) U.S. Cl.
CPC ...... *B01F 23/2321* (2022.01); *B01F 23/2322* (2022.01); *B01F 25/4335* (2022.01)

(56) References Cited

U.S. PATENT DOCUMENTS

| | | | |
|---|---|---|---|
| 2,563,002 | A | 8/1951 | Bissell et al. |
| 2,965,548 | A | 12/1960 | Hachmuth |
| 3,524,630 | A | 8/1970 | Marion |
| 3,799,195 | A | 3/1974 | Hermans |
| 4,123,800 | A | 10/1978 | Mazzei |
| 4,210,166 | A | 7/1980 | Munie |
| 4,416,610 | A | 11/1983 | Gallagher |
| 4,664,147 | A | 5/1987 | Maddock |
| 4,673,006 | A | 6/1987 | Speck |
| 4,812,049 | A | 3/1989 | McCall |
| 4,931,225 | A | 6/1990 | Cheng |
| 4,989,988 | A | 2/1991 | Hutter et al. |
| 4,993,495 | A | 2/1991 | Burchert |
| 5,145,256 | A | 9/1992 | Wiemers |
| 5,547,540 | A | 8/1996 | Ruscheweyh |
| 5,590,961 | A | 1/1997 | Rasmussen |
| 5,597,236 | A | 1/1997 | Fasano |
| 5,693,226 | A | 12/1997 | Kool |
| 5,796,798 | A | 8/1998 | Aujollet et al. |
| 5,839,828 | A | 11/1998 | Glanville |
| 5,863,128 | A | 1/1999 | Mazzi |
| 5,893,641 | A | 4/1999 | Garcia |
| 5,935,490 | A | 8/1999 | Archbold et al. |
| 5,971,604 | A | 10/1999 | Linga et al. |
| 6,132,079 | A | 10/2000 | King |
| 6,341,888 | B1 | 1/2002 | Ekholm et al. |
| 6,508,386 | B2 | 1/2003 | Magri |
| 6,572,258 | B1 | 6/2003 | Holland |
| 6,623,154 | B1 | 9/2003 | Garcia |
| 6,767,007 | B2 | 7/2004 | Luman |
| 6,986,832 | B2 | 1/2006 | Lamminen et al. |
| 7,357,565 | B2 | 4/2008 | Gopalan et al. |
| 7,416,326 | B2 | 8/2008 | Sakata et al. |
| 8,845,178 | B2 | 9/2014 | Hanada et al. |
| 9,227,161 | B2 | 1/2016 | Bormes et al. |
| 9,295,953 | B2 | 3/2016 | Linga et al. |
| 10,625,221 | B2 | 4/2020 | Schneider et al. |
| 10,644,337 | B2 | 5/2020 | Finnerty et al. |
| 2002/0096792 | A1 | 7/2002 | Valela et al. |
| 2003/0080037 | A1 | 5/2003 | Mazzei |
| 2003/0155436 | A1 | 8/2003 | Nilsen et al. |
| 2009/0174087 | A1 | 7/2009 | Bauer |
| 2015/0176542 | A1 | 6/2015 | Balsdon et al. |
| 2016/0030898 | A1 | 2/2016 | Devoy et al. |

FOREIGN PATENT DOCUMENTS

| | | | |
|---|---|---|---|
| DE | 2508665 | 9/1976 | |
| DE | 102006055655 | 5/2008 | |
| EP | 0300964 | 1/1989 | |
| EP | 0673885 | 9/1995 | |
| EP | 2016994 | 1/2009 | |
| EP | 2821130 | 1/2015 | |
| FR | 2933310 A1 * | 1/2010 | ............. B01D 3/008 |
| GB | 1152194 | 5/1969 | |
| KR | 20140002970 | 1/2014 | |
| WO | WO 99/03554 | 1/1999 | |
| WO | WO 2001/007169 | 2/2001 | |
| WO | WO 02/00334 | 1/2002 | |

OTHER PUBLICATIONS

Appeal against decision to refuse European Application No. 05792090.2, filed Feb. 6, 2017.

Decision of the Examining Division of the European Patent Office issued in European Application No. 05792090.2, dated Feb. 15, 2017.

International Search Report and Written Opinion issued in Corresponding PCT Application No. PCT/US2019/065030, dated Jun. 24, 2020.

International Search Report and Written Opinion issued in PCT/NO2005/000352, mailed on Jan. 24, 2006.

Office Action issued in European Application No. 05792090.2, dated Jul. 25, 2017.

Response to Attend Oral Proceedings filed in European Application No. 05792090.2, dated Apr. 11, 2014.

Response to Office Action issued in European Application No. 05792090.2, dated Nov. 16, 2017.

* cited by examiner

CONTACT TOWER TRAY AND RELATED METHODS

PRIORITY

This application claims the benefit of U.S. Provisional application 63/403,247 filed Sep. 1, 2022. This application claims priority to and incorporates herein by reference the above-referenced application in its entirety.

FIELD OF INVENTION

The present invention relates generally to mixers for use in contact tower processes, and more specifically, to mass transfer counter-current trays that may be suitable for processes, such as natural gas dehydration, natural gas sweetening, carbon capture, etc.

BACKGROUND

Several chemical processes utilize mixing towers (such as distillation towers, contact towers, or absorber towers) to mix or separate fluids. For example, in the oil and gas industry, contact towers can be utilized for dehydration of natural gas by mixing a liquid solvent, such as a glycol solution, with a natural gas to absorb different substances in the gas. To achieve suitable absorption rates, the contact tower includes several mixing components to increase contact between the liquid and the gas.

Currently, contact towers utilize structured packing, random packing, or bubble cap trays to facilitate mixing of the fluids and extraction or absorption of the desired substance. These contact towers require a specific number of “stages” (e.g., number of bubble trays or feet of packing) that are required to remove a target amount of a contaminant, such as water vapor. For large scale operations, the number of stages can be very high, commonly eight or more, and result in a significant tower height that can be greater than 100 feet. These contact towers also have restrictions on the throughput velocity of the gas flowing up the tower and thereby dictating the diameter of the tower for a given capacity.

SUMMARY

There exists a need for processes, systems, and contact towers that can more efficiently achieve mass transfer between fluids. Some aspects of the present mixers and contact towers provide improvements of the fluid interaction between two mixed fluids in adsorption operations. The increased fluid interaction and contact can enhance absorption and enable the use of smaller, more compact, contact towers. Some aspects of the present disclosure include an enhanced mixing device or mixing tray for use in a contact tower. The mixing device can include a first tray defining a plurality of first openings and a plurality of mixers coupled to the first tray. In some aspects, each mixer can include a first portion extending from the first tray and having a first sidewall and a second portion extending from the first portion, the second portion having a second sidewall. The first sidewall can define an inlet in communication with a respective one of the first openings, an outlet, a convergent channel extending between the inlet and the outlet of the first sidewall, and an injection port extending through the first sidewall and positioned between the inlet and outlet of the first sidewall. In some aspects, the second sidewall can define an inlet in communication with the outlet of the first sidewall, an outlet, and a divergent channel extending between the inlet and the outlet of the second sidewall.

In some configurations, the mixing device may include a second tray coupled to the second portion of the plurality of mixers. In such configurations, the first tray can be positioned vertically below the injection ports of the plurality of mixers and the second tray can be positioned vertically above the injection ports of the plurality of mixers. In some configurations, while positioned in a mixing chamber of the contact tower, the mixer defines: a gas flow path from a gas inlet, through the plurality of first openings, through the convergent channel, through the divergent channel to a gas outlet; and a liquid flow path from a liquid inlet, to the first tray, through the injection port, to the convergent channel, through the divergent channel, to the second tray. In some configurations, the first tray includes a maximum transverse dimension that is substantially equal to a maximum transverse dimension of a mixing vessel of the contact tower.

Some aspects may include a first conduit in communication with the second tray. The first conduit can be configured to transfer fluid from the second tray to a downstream location, such as is a tray of another mixing device. Some aspects may include a second conduit in communication with the first tray and configured to transfer fluid from an upstream location to the first tray. In some configurations, the convergent channel may be a convergent frustoconical channel. Additionally, or alternatively, the divergent channel may be a divergent frustoconical channel. The convergent channel can be in fluid communication with the first tray via the injection ports of the plurality of mixers. In some configurations, the plurality of mixers includes more than two mixers. The injection ports of the plurality of mixers can include at least two elongated slots extending circumferentially though the first sidewall. In some aspects, a ratio of a maximum transverse dimension of the outlet of the first portion to a maximum transverse dimension of the inlet of the first portion is between 0.33 and 0.67.

Some aspects can include a contact tower for treating gas. The contact tower can include a mixing vessel defining a chamber having a first side with a gas inlet and a liquid outlet and a second side with a gas outlet and a liquid inlet. In some configurations, a plurality of mixing trays can be disposed within the chamber between the first and second sides. Each mixing tray may include a first tray configured to hold a liquid and defining a plurality of first openings, an array of injection mixers coupled to the first tray, and a second tray configured to receive liquid from the mixers. In some aspects, each mixer can include a first sidewall defining: an inlet configured to receive gas from a respective one of the plurality of first openings, an outlet, a first channel extending between the inlet and the outlet of the first sidewall, and an injection port extending through the first sidewall and configured to receive the liquid from the first tray. Each mixer can include a second sidewall defining: an inlet configured to receive fluid from the outlet of the first sidewall, an outlet, and a second channel extending between the inlet and the outlet of the second sidewall. The second tray may be configured to receive liquid from the outlet of the second sidewall.

In some configurations, a height of the mixing vessel can be less than or equal to 100 feet. In some aspects, the plurality of mixing trays comprises less than 10 mixing trays. In some configurations, the mixing vessel defines a gas flow path from the gas inlet, through the plurality of first openings of the first tray of a first mixing tray of the plurality of mixing trays, through the first channels of the array of injection mixers of the first mixing tray, and through the second channels of the array of injection mixers of the first mixing trays, and to a second mixing tray of the plurality of mixing trays. The mixing vessel may define a liquid flow path from a liquid inlet, to the first tray of the first mixing tray, through the injection ports of the first mixing tray, through the first channels of the first mixing tray, and through the second channels of the first mixing tray, to the second tray. In some configurations, while liquid moves through the liquid flow path and gas moves through the gas flow path, the liquid is entrained by the gas as it enters the injection ports of the first mixing tray. The first mixing tray may be positioned vertically above the second mixing tray. In some such configurations, liquid flows from an inlet, to the first tray of the first mixing tray, through the injection ports of the first mixing tray, through the injection mixers of the first mixing tray, to the second tray of the first mixing tray, through a conduit, and to the first tray of the second mixing tray.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed configuration, the term "substantially" may be substituted with "within [a percentage] of" what is specified, where the percentage includes 0.1, 1, 5, and 10 percent.

Further, an apparatus or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus that "comprises," "has," or "includes" one or more elements possesses those one or more elements but is not limited to possessing only those elements. Likewise, a method that "comprises," "has," or "includes" one or more steps possesses those one or more steps but is not limited to possessing only those one or more steps.

Any configuration of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one configuration may be applied to other configurations, even though not described or illustrated, unless expressly prohibited by this disclosure or the nature of the configurations.

Some details associated with the configurations described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

DETAILED DESCRIPTION

Figure 1A:
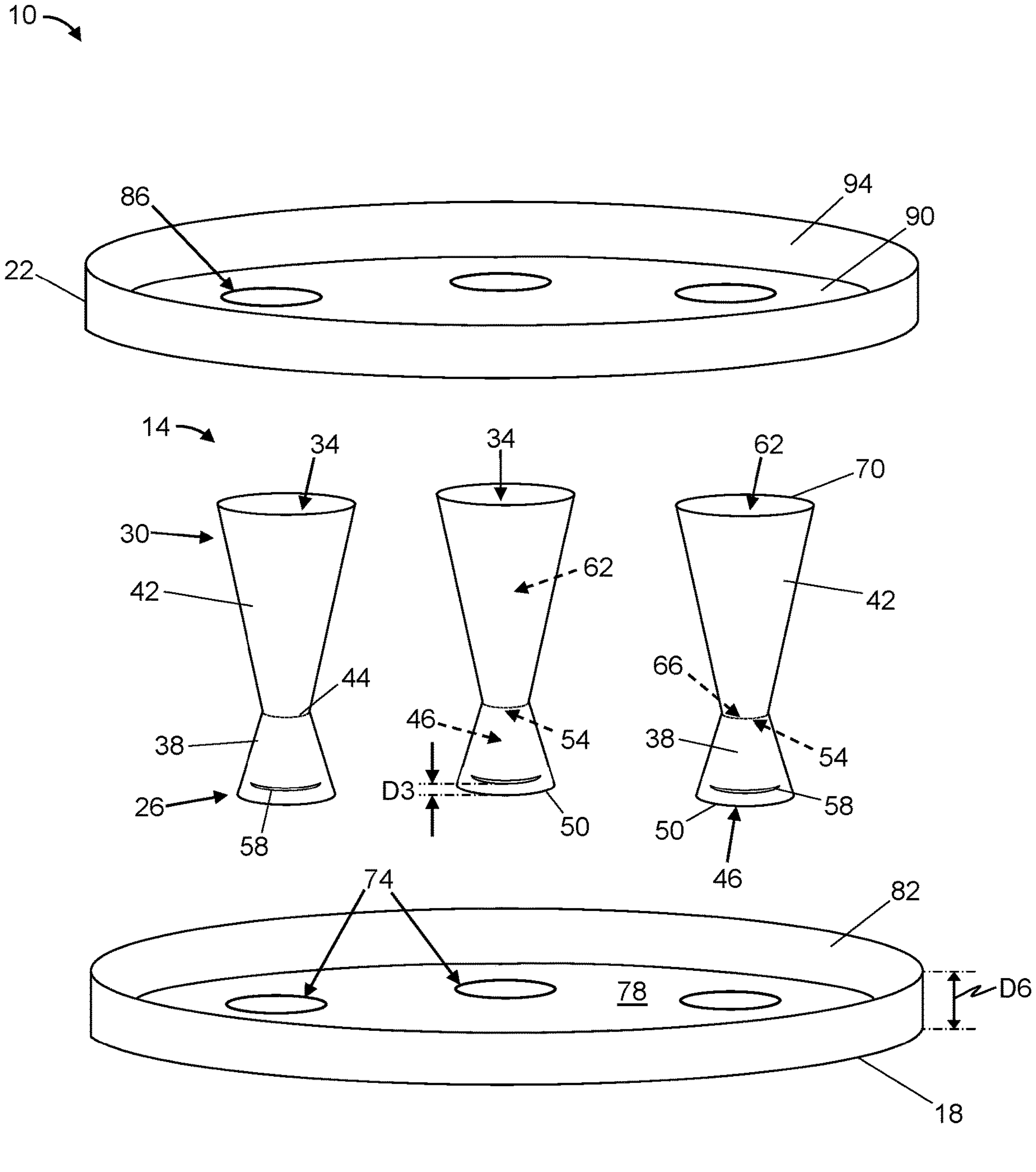
FIG. 1A is an exploded view of an example of a mixing device of the present disclosure.
Figure 1B:
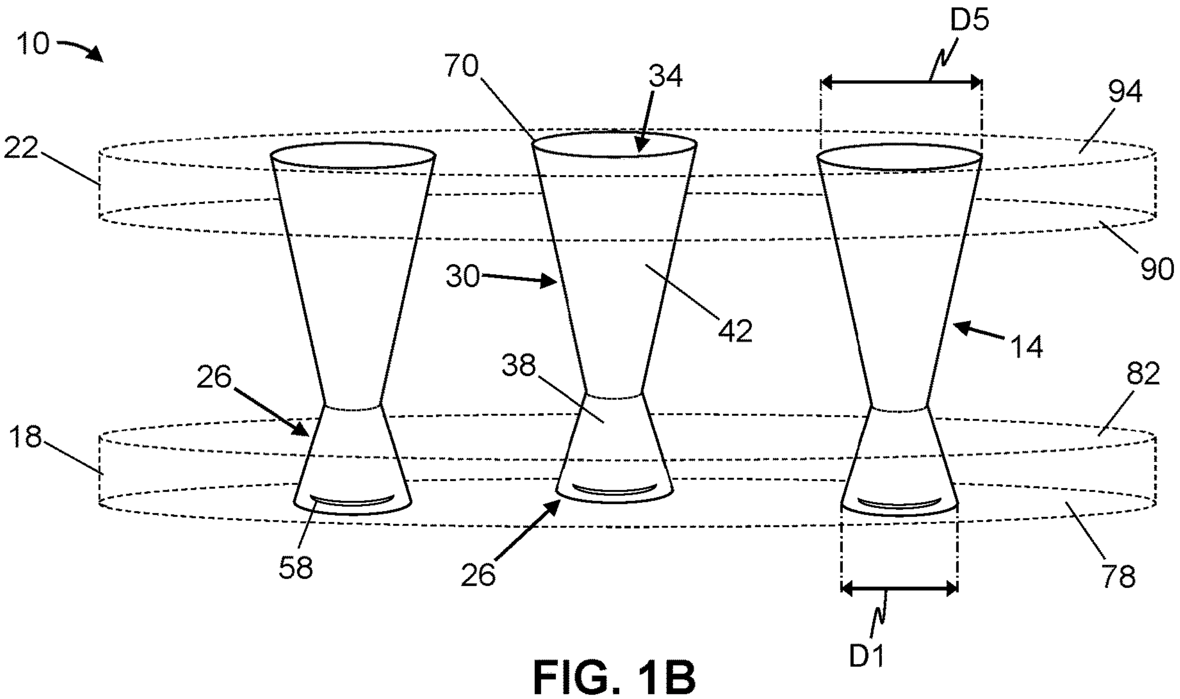
FIG. 1B is a perspective view of the mixing device of FIG. 1A.
Figure 1C:
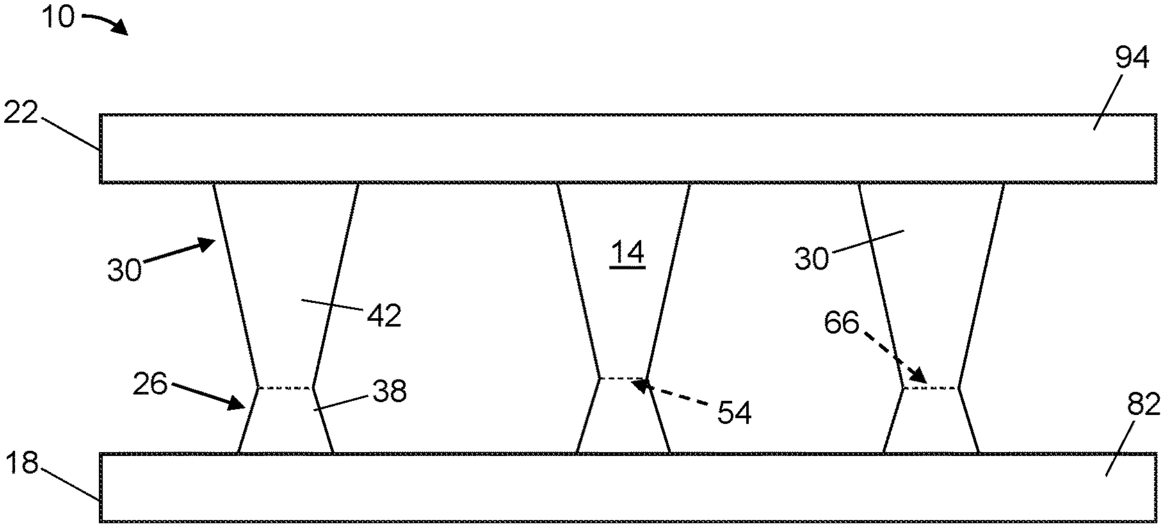
FIG. 1C is a side view of the mixing device of FIG. 1A.
Figure 3:
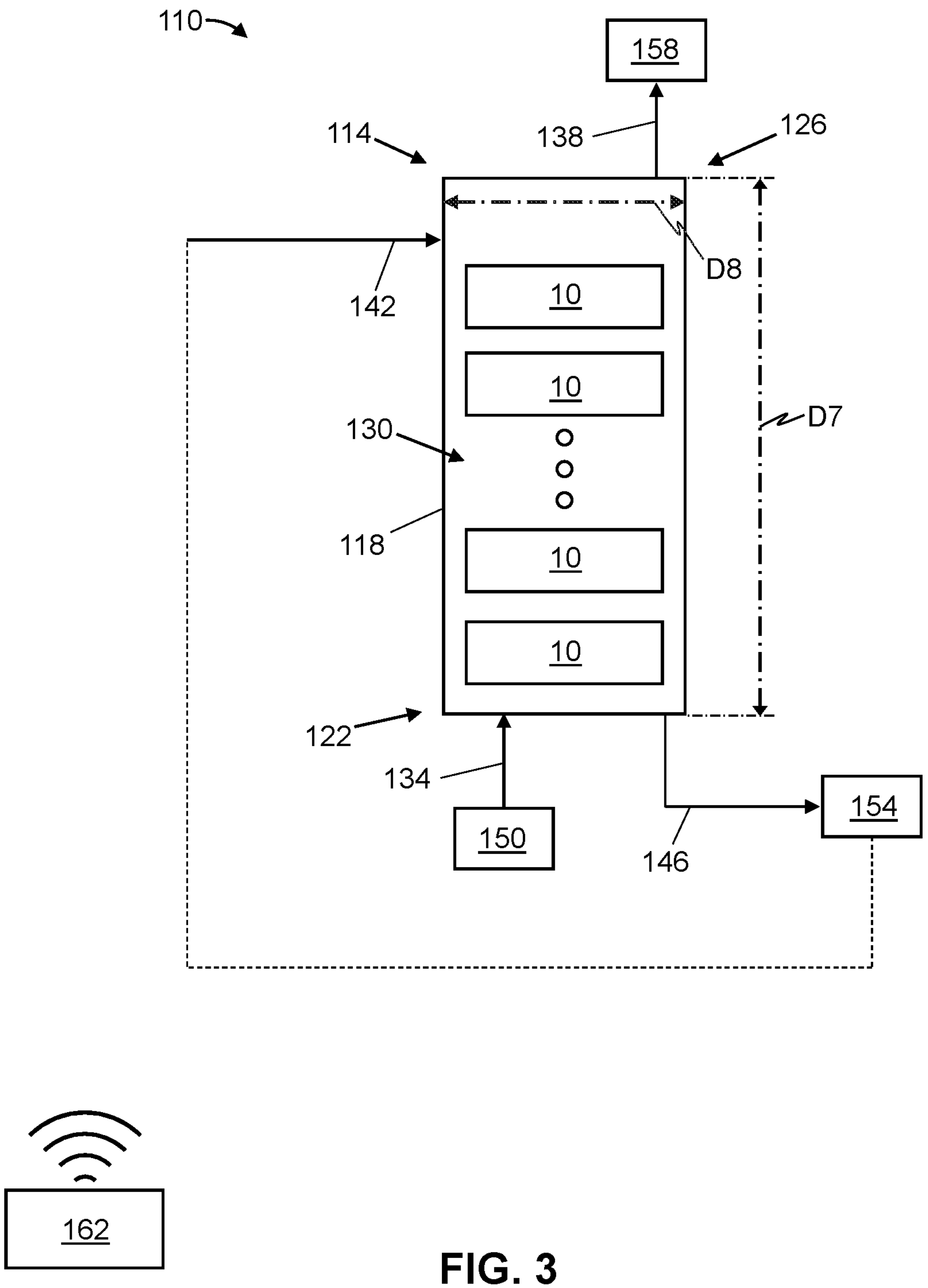
FIG. 3 is a schematic view of an example of another system of the present disclosure.

Referring now to the drawings, and more particularly to FIGS. 1A-1F, shown therein and designated by the reference numeral 10 is a mixing device. In the configuration shown, mixing device 10 includes a plurality of mixers 14, a first tray 18, and a second tray 22. For example, as shown in FIG. 1B, in which first tray 18 and second tray 22 are depicted as transparent for clarity, first tray 18 and second tray 22 are coupled to opposing ends of the mixers 14. Although three mixers 14 are depicted, it should be understood that the present systems may include more or less mixers. In some other configurations, as further described herein, first tray 18 or second tray 22 can be omitted from mixing device 10. Mixing device 10 (e.g., mixing tray) is configured to mix two fluids, such as a gas and a liquid, together. In some configurations, one or more mixing device 10 is configured to be utilized in counter current flow applications, such as for use in contact towers (e.g., 114 as shown in FIG. 3).

Each mixer 14 can include a first portion 26 and a second portion 30 that cooperate to define a passageway 34. For example, first portion 26 includes a first sidewall 38 that defines a part of passageway 34 and second portion 30 includes a second sidewall 42 that defines a separate part of the passageway. In some configurations, first sidewall 38 and second sidewall 42 are directly coupled together. In some such configurations, first sidewall 38 and second sidewall 42 each converge toward one another such that the meeting ends of first and second sidewalls 38, 42 form a throat 44 of passageway 34. Although not shown, first portion 26, second portion 30, or both may include an outer wall surrounding first and second sidewalls 38, 42, respectively.

Figure 1D:
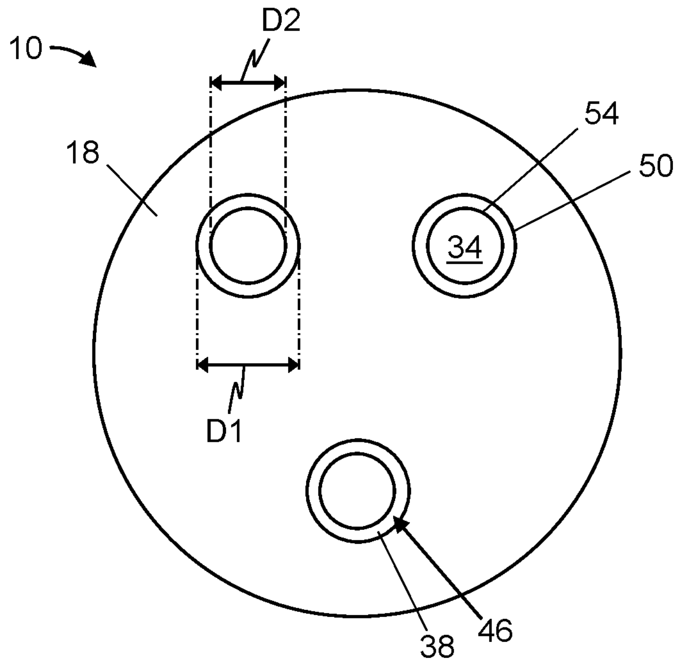
FIGS. 1D-1E is a top and bottom view, respectively, of the mixing device of FIG. 1A.
Figure 1E:
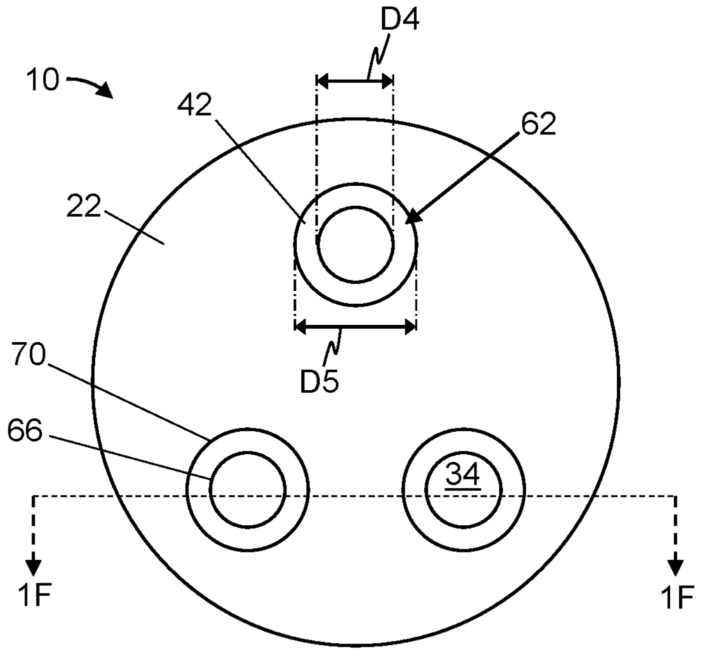

First sidewall 38 that defines a first channel 46 extending between an inlet 50 and an outlet 54 of the first sidewall. Inlet 50 and outlet 54 can be defined at a first and second end, respectively, of first sidewall 38. As best shown in FIG. 1D, a maximum transverse dimension D1 (e.g., diameter, major axis, etc.) of inlet 50 is greater than a maximum transverse dimension D2 of outlet 54 such that channel 46 converges as it extends from the inlet toward the outlet. First channel 46 (e.g., convergent channel) can be any suitable shape and, in some configurations, the first channel is a convergent frustoconical channel. In some configurations, maximum transverse dimension D1 of inlet 50 may be greater than, equal to, or between any two of: 2, 3, 4, 5, 6, 7, 8, or 10 inches (e.g., 4 to 7 inches or at least 3 inches). Additionally, or alternatively, maximum transverse dimension D2 of outlet 54 may be greater than, equal to, or between any two of: 1, 2, 3, 4, 5, 6, 7, or 8 inches. In some configurations, a ratio of maximum transverse dimension D2 of outlet 54 to maximum transverse dimension D1 of inlet 50 may be equal to or between 0.33 and 0.67.

First sidewall 38 may defines an injection port 58 positioned between inlet 50 and outlet 54. Injection port 58 may include one or multiple apertures (e.g., slits) extending through first sidewall 38 and in communication with channel 46. These apertures can extend circumferentially around first sidewall 38. In some configurations, injections port 58 can include two elongated apertures extending circumferentially though the first sidewall 38 and, in other configurations, the injection port can include more than two apertures (e.g., 3, 5, 8, 10, 12, 15, 18, 20 or more) spaced along and extending through the first sidewall. These apertures may have any suitable geometry, such as circular, elliptical, otherwise rounded, rectangular, hexagonal, otherwise polygonal, or the like. In some such configurations, these apertures may be elongated such that the length (measured circumferentially) of the aperture is greater than the height of the apertures by at least 10% (e.g., greater than, equal to, or between any two of: 15%, 20%, 25%, 30%, 40%, 50%, 75%, 100%, 150% or greater). In some configurations, injection port 58 may include apertures equidistantly spaced along the perimeter of first sidewall 38. As shown in FIG. 1A, injection port 58 can be positioned closer to inlet 50 than outlet 54. In other configurations, injection port 58 can be positioned closer to outlet 54 than inlet 50. In some configurations, injection port 58 may be spaced away from inlet 50 by a distance D3 that is greater than, equal to, or between any two of: 1, 2, 3, 4, or 5 inches. For example, a position, geometry, number of apertures, or other parameter of injection port can be selected based on liquid flowrate, gas flowrate, and other understood parameters of fluid mechanics (e.g., Reynolds, Stokes, Weber, Sherwood numbers, or the like). In some configurations, a velocity through a throat of mixer 14 can be greater than 75 meters per second (m/s), such as, for example, up to 80, 90, 95, 100, 110, 120, or 150 m/s. However, this velocity can be balanced with the liquid flow rate into injection ports 58, the pressure drop after exiting mixers 14, or the like.

Second sidewall 42 defines a second channel 62 extending between an inlet 66 and an outlet 70 of the second sidewall. Inlet 66 and outlet 70 can be defined at a first and second end, respectively, of second sidewall 42. As shown, a maximum transverse dimension D4 of inlet 66 is less than a maximum transverse dimension D5 of outlet 70 such that channel 62 diverges as it extends from the inlet toward the outlet. Second channel 62 (e.g., divergent channel) can be any suitable shape and, in some configurations, the second channel is a divergent frustoconical channel.

Figure 1F:
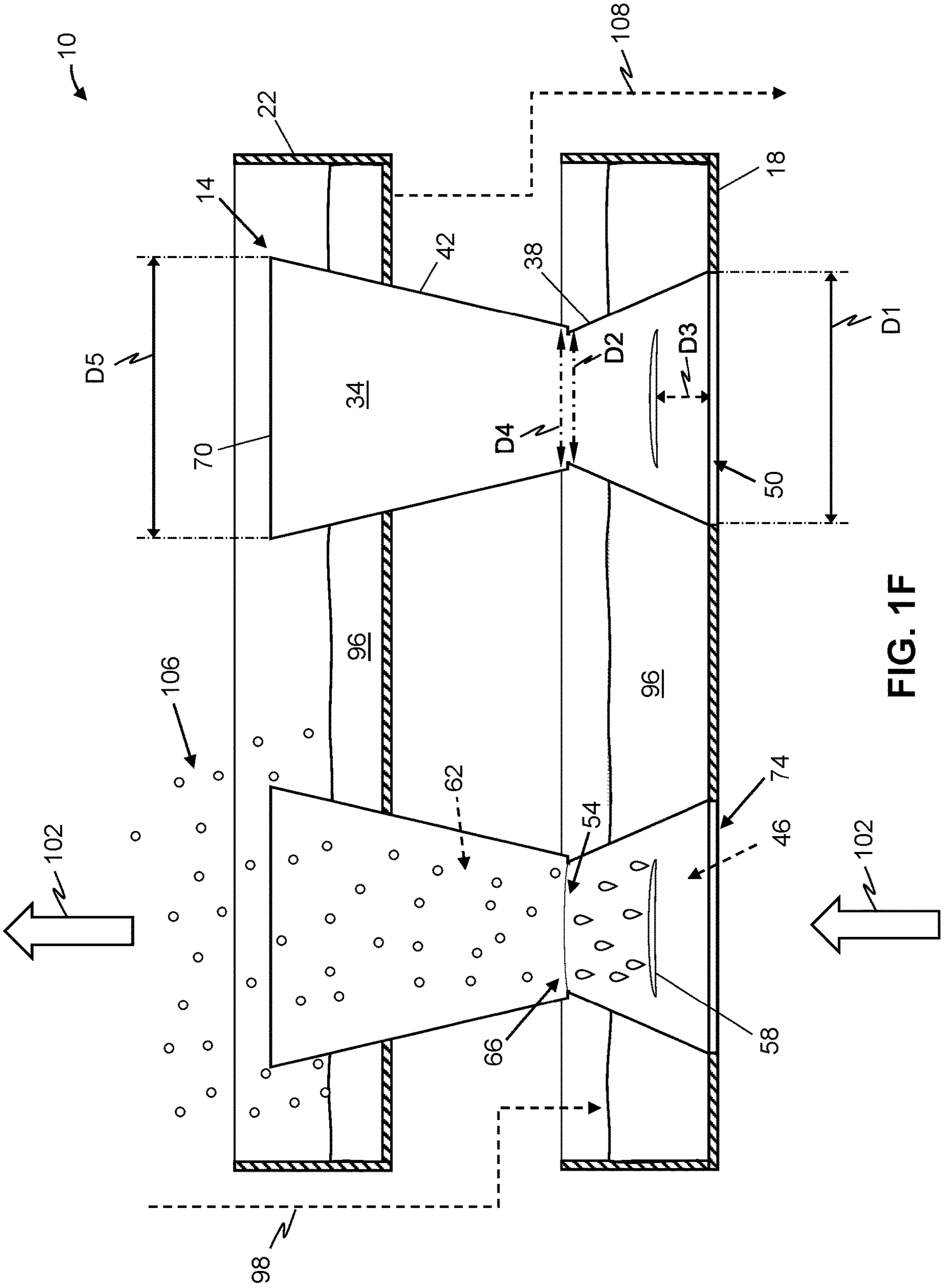
FIG. 1F is a sectional view of the mixing device of FIG. 1A taken along line 1F-1F of FIG. 1E during a dehydration operation.

In some configurations, inlet 66 of second sidewall 42 and outlet 54 of first sidewall may be substantially co-planar. Maximum transverse dimension D4 of inlet 66 can be equal to or offset from maximum transverse dimension D2 of outlet 54. For example, as shown in FIG. 1F, maximum transverse dimension D4 of inlet 66 can be greater than maximum transverse dimension D2 of outlet 54. In such configurations, the offset can be less than 10% (e.g., maximum transverse dimension D4 is less than 110% of maximum transverse dimension D2). In some such configurations, first sidewall 38 and second sidewall 42 form a leading edge at throat 44. Additionally, or alternatively, a ratio between the offset of maximum transverse dimension D4 and maximum transverse dimension D2 and maximum transverse dimension D2 ((D4−D2)/D2) may be between or equal to 0.1 and 1.0, such as 0.1, 0.2, 0.3, 0.4, 0.5, 0.6, 0.7, 0.8, or 0.9.

In some configurations, maximum transverse dimension D4 of inlet 66 may be greater than, equal to, or between any two of: 1, 2, 3, 4, 5, 6, 7, or 8 inches. In some configurations, a ratio of maximum transverse dimension D2 to maximum transverse dimension D1 (D2/D1) can be between 0.4 and 0.7, (e.g., 0.45 to 0.65 or any other values therebetween). Additionally, or alternatively, maximum transverse dimension D5 of outlet 70 may be greater than, equal to, or between any two of: 2, 3, 4, 5, 6, 7, 8, or 10 inches. In some configurations, a ratio of maximum transverse dimension D5 to maximum transverse dimension D1 may be greater than, equal to, or between 0.8 and 1.2. As shown, maximum transverse dimension D5 of outlet 70 is greater than maximum transverse dimension D1 of inlet 50, however, in other configurations, maximum transverse dimension D5 can be equal to or less than maximum transverse dimension D1. In some such configurations, a ratio of maximum transverse dimension D2 to maximum transverse dimension D5 (D2/D5) can be between 0.4 and 0.7, (e.g., 0.45 to 0.65 or any other values therebetween).

Each of mixers 14 is configured to be coupled to first tray 18, second tray 22, or both. As shown in FIG. 1A, first tray 18 defines a plurality of first openings 74 that are configured to be in communication with passageway 34 of mixers 14 when the mixer is coupled to the first tray. For example, inlet 50 of first sidewall 38 can be aligned with a first opening 74 to define a flow path through first tray 18 and mixer 14. The number of mixers 14 and the number of first openings 74 can be equal such that each of the first openings is in communication with passageway 34 of a mixer. In some configurations, first tray 18 can include a base 78 and a sidewall 82 extending upward from and surrounding the base. In such configurations, base 78 can define first openings 74 and sidewall 82 can extend above the base by a height D6 that is greater than distance D3 between inlet 50 and injection port 58.

Second tray 22 can be coupled to mixers 14 and is configured to hold a volume of fluid. For example, as shown in FIG. 1A, second tray 22 can define a plurality of second openings 86 configured to be coupled to second portion 42 of mixers 14. In some configurations, second tray 22 includes a base 90 and a sidewall 94 extending upward from and surrounding the base. Base 90 may be substantially planar and, in some configurations, can be inclined to facilitate draining of liquid from second tray 22. In other configurations, base 90 can be contoured toward a drainage point to transfer liquid from second tray 22.

Second tray 22 can be positioned vertically above first tray 18 when coupled to mixers 14. For example, as shown in FIG. 1B, first tray 18 is coupled to first portion 26 (e.g., at first sidewall 38) and second tray 22 is coupled to second portion 30 (e.g., at second sidewall 42). In such configurations, injection ports 58 are interposed between first and second trays 18, 22. In an illustrative example, first tray 18 is coupled to inlet 50 of first sidewall 38 and second tray 22 is coupled to second sidewall 42 at a location between inlet 66 and outlet 70 of the second sidewall. First tray 18 may be coupled to first sidewall 38 such that while the first tray is filed with liquid, the liquid flows through injection port 58.

Additionally, or alternatively, second tray 22 may be coupled to second sidewall 42 such that while the second tray is filed with liquid, the liquid does not overflow into outlet 70. To illustrate, base 90 of second tray 22 can be spaced below outlet 70 of second sidewall 42 by a distance that is greater than 0.8 to 0.4 of the distance between inlet 66 and outlet 70.

Referring now to FIG. 1F, a sectional view of mixing device 10 taken along line 1F-1F is shown. FIG. 1F illustrates an interior of mixers 14 during a mixing operation in which a first fluid 96 (e.g., a liquid) is mixed with a second fluid 102 (e.g., gas) in co-current flow conditions. The mixing device 10 also operates in counter current flow conditions as liquid collected on tray 22 flows by gravity to the device 10 (e.g., tray 18) below. For enhanced appearance, first and second fluid 96, 102 are only shown in one of the mixers (e.g., 14), but a skilled person would understand each mixer would operate in substantially the same manner.

First fluid 96 is introduced to first tray 18 from an upstream location (e.g., reservoir, separate mixer, or the like). As shown in FIG. 1F, first fluid 96 is delivered to first tray 18 via a first conduit 98. As first fluid 96 is delivered, the fluid level within first tray 18 begins to rise until it reaches injections port 58 at which point the first fluid may begin to enter first channel 46 via the injection port. Depending on relevant pressures of first channel 46, first fluid 96 can rise above injections port 58 to build up sufficient pressure to enter the first channel. Introduction of first fluid can be adjusted based on the parameters of injection port 58 such as, for example, the geometry, size, location, or number of apertures.

Second fluid 102 may be simultaneously introduced to first channel 46 via first openings 74 in first tray 18. Second fluid 102 is configured to be delivered at a suitable flow rate and pressure such that the second fluid carries first fluid 96 upward toward outlet 54 of first sidewall 38. As first fluid 96 travels from injection port 58 to outlet 54, the majority of first fluid can be in contact with first sidewall 38. In some configurations, first fluid 96 can form a thin film along a surface of first sidewall 38 near outlet 54. As first fluid 96 reaches outlet 54 of first sidewall 38, the first fluid is released from the first sidewall and enters second channel 62. The transfer from first channel 46 to second channel 62 may cause first fluid 96 to break up into multiple droplets 106. The droplets 106 are then carried by second fluid 102 toward outlet 70 of second sidewall 42. In some configurations, further breakup of droplets 106 occur as the droplets move through second channel 62 in the zone of the vena contracta. As second fluid 96 moves past outlet 70 of second sidewall 42 the velocity of the fluid decreases and less force is applied to droplets 106. The droplets 106 can then fall downward to second tray 22 where they coalesce and, in some configurations, can be delivered further downstream via a second conduit 108. Some of the systems and methods described herein can utilize a coalescing mechanism, such as a mesh pad, vane pack, axial flow cyclone, or the like, to assist in coalescence of droplets 106 exiting outlet 70.

During operation, mixing device 10 defines two separate flow paths for each of first and second fluids 96, 102. For example, each mixer 14 may define a first flow path (e.g., liquid flow path) of first fluid 96 from conduit 98, to first tray 18, through injection port 58 to first channel 46, through second channel 62, to second tray 22. In some configurations, the first flow path may include moving first fluid 96 from second tray 22 to conduit 108 and into another component, such as another mixing device (e.g., 10), a container, a regeneration system (e.g., three-phase flash separator, reboiler, etc.), piping, or other component. Additionally, or alternatively, each mixer 14 may define a second flow path (e.g., gas flow path) of second fluid 102 from a fluid source (e.g., tower inlet, gas scrubber, etc.) through first openings 74, through first channel 46, through second channel 62, and to an outlet (e.g., outlet 70). In some configurations, the second flow path may include moving second fluid 102 from the outlet to a mixing device (e.g., 10) above or to another component, such as a container, piping, or other component.

As second fluid 102 travels through passageway 34 (e.g., first channel 46 and second channel 62), it interacts with a lager surface area of first fluid 96, in the form of droplets 106, than a typical contact tower internal mixing process. As an illustrative example, first fluid 96 may be Triethylene Glycol (TEG) and second fluid 102 may be natural gas. In this example, as the TEG and natural gas are mixed, water vapor is transferred from the natural gas to the TEG when the fluids pass through mixer 14. As a result, the TEG (e.g., 96) in second tray 22 has a higher water vapor content than the TEG in first tray 18. Conversely, the natural gas (e.g., 102) exiting mixer 14 has a lower water vapor content than (i.e., leaner than or drier than) the natural gas entering mixer 14. Due to the intimate contact of the natural gas (e.g., 102) with TEG droplet (e.g., 106), mixers 14 increases the absorption of water vapor associated with the natural gas. Although described with respect to TEG and natural gas, other fluids can be used as first and second fluids 96, 102. For example, first fluid 96 can include amines, solvents, quenching fluids, coolants, adsorbents, proprietary solvents, potassium chloride, or the like. Additionally, or alternatively, second fluid 102 can include carbon dioxide, hydrocarbon fractions, industrial gases, or the like.

Figure 2:
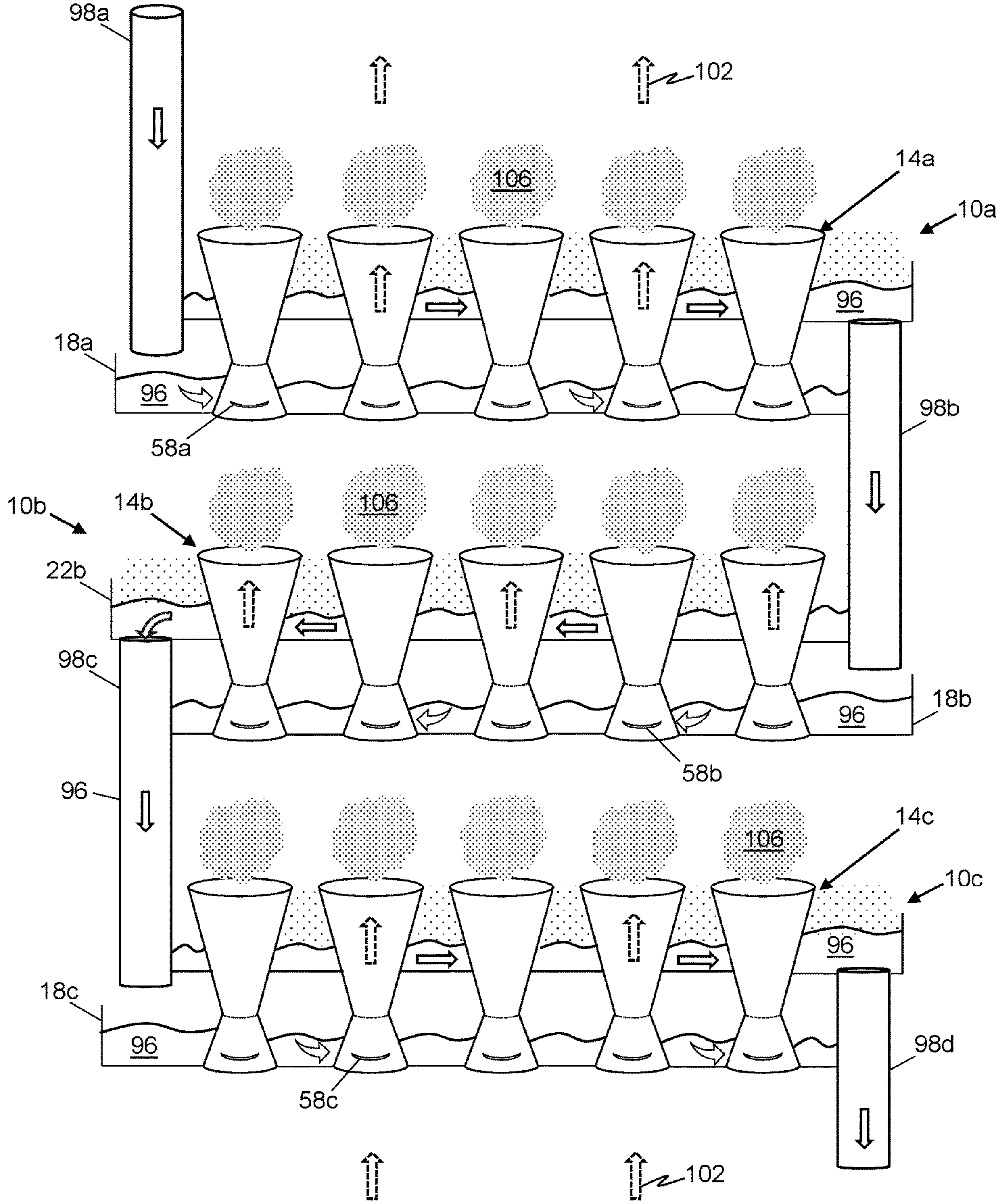
FIG. 2 is a schematic view of an example of a system of the present disclosure.

Referring now to FIG. 2, a system 100 is shown during a mixing operation. System 100 includes a plurality of mixing devices (e.g., 10) cooperating to mix first fluid 96 and second fluid 102. In this configuration, components that are similar (e.g., in structure and/or function) to components discussed with reference to FIGS. 1A-2 are labeled with the same reference numerals and a suffix (e.g., "a," "b," "c").

System 100 includes a first mixing device 10*a*, a second mixing device 10*b*, and a third mixing device 10*c*. Each of first, second, and third mixing devices 10*a*-10*c* can include or correspond to mixing device 10. Each of the mixing devices 10*a*-10*c* can be connected via a conduit (e.g., 98, 108). For example, in the depicted embodiment, a first conduit 98*a* is configured to deliver first fluid 96 to mixing device 10*a*, a second conduit 98*b* is configured to deliver the first fluid to mixing device 10*b*, a third conduit 98*c* is configured to deliver the first fluid to mixing device 10*c*, and a fourth conduit 98*d* is configured to deliver the first fluid from the mixing device 10*c* to another location.

First mixing device 10*a* includes an array of mixers 14*a*, a first tray 18*a*, and a second tray 22*a*. Mixers 14*a*, first tray 18*a*, and second tray 22*a* may include or correspond to mixers 14, first tray 18, and second tray 22, respectively. As shown, first fluid 96 is delivered to first tray 18*a* via first conduit 98*a*. In some configurations, such as that where first mixing device 10*a* is a top-most mixing device in a contact tower, first fluid 96 entering the first mixing device can be a dry or lean fluid. For example, fluid from first conduit 98*a* may come from a regeneration system. First fluid 96 in first tray 18*a* will flow into an injection port 58*a* of mixers 14*a* where it is transferred through the mixers and forms droplets 106. The droplets 106 can then precipitate into low-pressure areas and coalesce in second tray 22*a*. While in second tray 22*a*, first fluid 96 flows through second conduit 98*b* to mixing device 10*b*. In some configurations, second conduit 98*b* may extend through first tray 18 without being in communication with the first tray. For example, second conduit 98*b* may extend through an aperture defined in first tray 18.

Second mixing device 10*b* includes an array of mixers 14*b*, a first tray 18*b*, and a second tray 22*b*. Mixers 14*b*, first tray 18*b*, and second tray 22*b* may include or correspond to mixers 14, first tray 18, and second tray 22, respectively. As shown, first fluid 96 is delivered to first tray 18*b* via second conduit 98*b*. In some configurations in which system 100 is utilized for dehydration, first fluid 96 in first tray 18*b* of second mixing device 10*b* will have a higher water vapor content than the first fluid in first tray 18*a* of first mixing device 10*a*. First fluid 96 in first tray 18*b* will flow into an injection port 58*b* of mixers 14*b* where it is transferred through the mixers and forms droplets 106. The droplets 106 can then precipitate into low-pressure areas and coalesce in second tray 22*b*. While in second tray 22*b*, first fluid 96 flows through third conduit 98*c* to third mixing device 10*c*.

Third mixing device 10*c* includes an array of mixers 14*c*, a first tray 18*c*, and a second tray 22*c*. Mixers 14*c*, first tray 18*c*, and second tray 22*c* may include or correspond to mixers 14, first tray 18, and second tray 22, respectively. As shown, first fluid 96 is delivered to first tray 18*c* via third conduit 98*c*. In some configurations in which system 100 is utilized for dehydration, first fluid 96 in first tray 18*c* of third mixing device 10*c* will have a higher water vapor content than the first fluid in first tray 18*a* of first mixing device 10*a* and the first fluid in first tray 18*b* of second mixing device 10*b*. First fluid 96 in first tray 18*c* will flow into an injection port 58*c* of mixers 14*c* where it is transferred through the mixers and forms droplets 106. The droplets 106 can then precipitate into low-pressure areas and coalesce in second tray 22*c*. While in second tray 22*c*, first fluid 96 may flows through fourth conduit 98*d* to another component.

Contrary to first fluid 96, second fluid 102 flows upward through mixing devices 10*a*-10*c*. As depicted, second fluid 102 enters an inlet (e.g., inlet 50) of mixers 14*c* of the third mixing device 10*c*. In some configurations, such as that where third mixing device 10*c* is a bottom-most mixing device in a contact tower, second fluid 102 entering the third mixing device can be a wet or rich fluid. Upon entering mixers 14*c*, second fluid 102 increases velocity (e.g., within the convergent channel) and transfers first fluid 96 entering injection port 58*c* upward through an outlet (e.g., outlet 70) of the mixers. As second fluid 102 exits mixers 14*c* its velocity is reduced and first fluid 96 (e.g., in the form of droplets 106) fall back down toward second tray 22*c* while the second fluid continues toward second mixing device 10*b*.

Second fluid 102 flows upward through second mixing device 10*b*. For example, second fluid 102 enters an inlet (e.g., inlet 50) of mixers 14*b* of second mixing device 10*b* and transfers first fluid 96 entering injection port 58*b* upward through an outlet (e.g., outlet 70) of the mixers. In some configurations in which system 100 is utilized for dehydration, second fluid 102 exiting mixers 14*b* of second mixing device 10*b* will have a lower water vapor content than the second fluid exiting mixers 14*c* of third mixing device 10*c*. Second fluid 102 continues to flow upward through first mixing device 10*a*. For example, second fluid 102 enters an inlet (e.g., inlet 50) of mixers 14*a* of first mixing device 10*a* and transfers first fluid 96 entering injection port 58*a* upward through an outlet (e.g., outlet 70) of the mixers. In some configurations in which system 100 is utilized for dehydration, second fluid 102 exiting mixers 14*a* of first mixing device 10*a* will have a lower water vapor content than the second fluid entering or exiting mixers 14*c* of third mixing device 10*c* and mixers 14*b* of second mixing device 10*b*.

As described herein, system 100 can define a flow path (e.g., gas flow path) of second fluid 102 from a gas source (e.g., gas inlet of tower) through a plurality of openings (e.g., 74) in first tray 18*c* of third mixing device, though the array of injection mixers 14*c* (e.g., through first channel 46 and second channel 62), and to second mixing device 10*b*. Additionally, or alternatively, system 100 can define a flow path (e.g., liquid flow path) of first fluid 96 from a liquid source (e.g., liquid inlet of tower, first conduit 98*a*, second conduit 98*b*, third conduit 98*c*, or the like) to first tray 18*c* of third mixing device 10*c*, through injection ports 58*c*, through mixers 14*c* (e.g., through first channel 46 and second channel 62) to second tray 22*c*. It should be understood that system 100 can define similar flow paths (e.g., gas and liquid flow paths) through other mixing devices, such as, first mixing device 10*a* and second mixing device 10*b*.

Referring now to FIG. 3, a system 110 is shown having a contact tower 114 configured to treat fluids. System 110 may include or correspond to system 100 or one or more components thereof, such as mixing devices or conduits. Although system 110 is described herein for natural gas dehydration, the system may be adapted for any suitable contact tower application such as, for example, gas sweetening (removal of CO2 and H2S) from natural gas and carbon dioxide (CO2) capture from flue gases, cement plants, steel mills, power plants, or the like.

Contact tower 114 includes a vessel 118 extends from a first side 122 to a second side 126 and defines a chamber 130 in which two fluids (e.g., first and second fluids 96, 102) are configured to be mixed together. As shown, a plurality of mixing devices 10 (e.g., mixing trays) are disposed within chamber 130 between first side 122 and second side 126. Any number of suitable mixing devices can be utilized during an operation, such as the dehydration of natural gas. In some configurations, the system may include between two and twenty-five mixing devices (or any interval therebetween) disposed within chamber 130, such as less than 15, 10, 8 or 5 mixing devices. As described herein, mixing device 10, 10*a*, 10*b*, 10*c* may establish a counter-current flow path of the first fluid 96 (e.g., solvent) and the second fluid 102 (e.g., gas) in contact tower 114. In some configurations, mixing device 10, 10*a*, 10*b*, 10*c* may establish a co-current flow path of the first fluid 96 (e.g., solvent) and the second fluid 102 (e.g., gas) in contact tower 114.

In the depicted configuration, vessel 118 includes a gas inlet 134 at first side 122 and a gas outlet 138 at second side 126. In some such configurations, vessel 118 includes a liquid inlet 142 at second side 126 and a liquid outlet 146 at first side 122. Each of gas inlet 134, gas outlet 138, liquid inlet 142, and liquid outlet 146 are in communication with chamber 130 so that fluid may transferred through vessel 118. As depicted, gas inlet 134 and gas outlet 138 are positioned on opposing sides of mixing devices 10 so that a fluid traveling between the gas inlet and outlet must pass through the mixing devices. Likewise, liquid inlet 142 and liquid outlet 146 are positioned on opposing sides of mixing devices 10 and a fluid will travel through the mixing devices when moving from the liquid inlet to the liquid outlet. As shown, gas inlet 134 and liquid inlet 142 may be disposed on opposing sides in counter-current applications.

As explained herein, mixing devices 10 can provide increased contact between two fluids passing through mixing devices 10 as compared to conventional mixing devices (e.g., bubble trays, random packing, structured packing). Therefore, in the context of natural gas dehydration, the same amount of water vapor can be removed from natural gas with fewer steps. In this manner, a number of mixing devices 10 can be decreased relative to traditional mixing devices without decreasing adsorption. As an example, vessel 118 can include less than or between any two of the following number of mixing devices: 15, 12, 10, 8, 7, 6, 5, 4, 3, or 2 mixing devices. Additionally, or alternatively, a height D7 of vessel 118 can be less than 300, 200, 150, 100, 75, 50, 40, or 30 feet. In some configurations, height D7 can be half of the height of a conventional contactor without sacrificing performance. Mixing devices 10 are also able to operate at higher velocities than traditional mixing devices and, therefore, a maximum transverse dimension D8 (e.g., diameter) of vessel 118 can be decreased. In an illustrative example, maximum transverse dimension D8 of vessel 118 can be less than, equal to, or between any two of 2, 3, 4, 5, 6, 8 or 10 meters. Accordingly, vessel 118 can be smaller than conventional contact towers without sacrificing performance.

In some configurations, system 110 can include a scrubber 150, a regeneration unit 154, a demister 158, a controller 162, or combination thereof. For example, scrubber 150 may be in communication with gas inlet 134 and configured to remove free liquids from a gas before transferring the gas to the gas inlet. In some configurations, scrubber 150 may be integral with vessel 118. Regeneration unit 154 is configured to separate the water vapor adsorbed by the liquid during dehydration. Regeneration unit 154 can include a reboiler, surge tank, still column, piping, phase separator, pump, filter, strainer, heater, or the like. As shown, regeneration unit 154 may be in communication with liquid outlet 146 and liquid inlet 142 so that once water vapor is removed, the lean liquid can be recycled back to the liquid inlet to be used again. Demister 158 can be a vessel used to capture any solvent remaining in the lean natural gas once the gas (e.g., 102) exits vessel 118, via gas outlet 138 prior to entering into either a pipeline for distribution or storage. In other configurations, a meter can be utilized with or in place of demister 158 to measure an amount of gas entering gas outlet 138. Although not shown herein, system 110 can include one or more other components such as valves, piping, pumps, fans, heaters, temperature exchangers, separators, compressors or other known components.

Controller 162 may include a processor coupled to a memory (e.g., a computer-readable storage device) and is configured to facilitate performance of the operations described above. In some configurations, controller 162 may include one or more application(s) that access processor and/or memory to operate system 110. The processor may include or correspond to a microcontroller/microprocessor, a central processing unit (CPU), a field-programmable gate array (FPGA) device, an application-specific integrated circuits (ASIC), another hardware device, a firmware device, or any combination thereof. The memory, such as a non-transitory computer-readable storage medium, may include volatile memory devices (e.g., random access memory (RAM) devices), nonvolatile memory devices (e.g., read only memory (ROM) devices, programmable read-only memory, and flash memory), or both. The memory may be configured to store instructions, one or more thresholds, one or more data sets, or combination thereof. In some configurations, instructions (e.g., control logic) may be configured to, when executed by the one or more processors, cause the processor(s) to perform one or more operations such as, for example, actuate valves, change volume, velocity, pressure, or other parameter of the liquid (e.g., 96) or the gas (e.g., 102) entering vessel. Controller 162 can be coupled to one or more sensors that can measure or determine a volume, velocity, pressure, water vapor content, or other parameter of a fluid.

The above specification and examples provide a complete description of the structure and use of illustrative configurations. Although certain configurations have been described above with a certain degree of particularity, or with reference to one or more individual configurations, those skilled in the art could make numerous alterations to the disclosed configurations without departing from the scope of this invention. As such, the various illustrative configurations of the methods and systems are not intended to be limited to the particular forms disclosed. Rather, they include all modifications and alternatives falling within the scope of the claims, and configurations other than the one shown may include some or all of the features of the depicted configurations. For example, elements may be omitted or combined as a unitary structure, connections may be substituted, or both. Further, where appropriate, aspects of any of the examples described above may be combined with aspects of any of the other examples described to form further examples having comparable or different properties and/or functions and addressing the same or different problems. Similarly, it will be understood that the benefits and advantages described above may relate to one configuration or may relate to several configurations. Accordingly, no single implementation described herein should be construed as limiting and implementations of the disclosure may be suitably combined without departing from the teachings of the disclosure.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims. The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A mixing device for use in a contact tower, the mixing device comprising:
- a first tray configured to hold a volume of fluid and defining a plurality of first openings;
- a plurality of mixers coupled to the first tray, each mixer having:
  - a first portion extending from the first tray, the first portion having a first sidewall that defines:
    - an inlet in communication with a respective one of the first openings;
    - an outlet;
    - a convergent channel extending between the inlet and the outlet of the first sidewall; and
    - an injection port extending through the first sidewall and positioned between the inlet and outlet of the first sidewall;
  - a second portion extending from the first portion, the second portion having a second sidewall that defines:
    - an inlet in communication with the outlet of the first sidewall;
    - an outlet; and
    - a divergent channel extending between the inlet and the outlet of the second sidewall.

2. The mixing device of claim 1, further comprising a second tray configured to hold a volume of fluid, the second tray coupled to the second portion of the plurality of mixers.

3. The mixing device of claim 2, wherein the first tray is positioned vertically below the injection ports of the plurality of mixers and the second tray is positioned vertically above the injection ports of the plurality of mixers.

4. The mixing device of claim 2, further comprising a first conduit in communication with the second tray and configured to transfer fluid from the second tray to a downstream location.

5. The mixing device of claim 4, wherein the downstream location is a third tray of another mixing device.

6. The mixing device of claim 1, further comprising a second conduit in communication with the first tray and configured to transfer fluid from an upstream location to the first tray.

7. The mixing device of claim 1, wherein the convergent channel is a convergent frustoconical channel.

8. The mixing device of claim 7, wherein the divergent channel is a divergent frustoconical channel.

9. The mixing device of claim 1, wherein the convergent channel is in fluid communication with the first tray via the injection ports of the plurality of mixers.

10. The mixing device of claim 1, wherein the first tray includes a maximum transverse dimension that is substantially equal to a maximum transverse dimension of a mixing vessel of the contact tower.

11. The mixing device of claim 2, wherein, while positioned in a mixing chamber of the contact tower, the mixer defines:

a gas flow path from a gas inlet, through the plurality of first openings, through the convergent channel, through the divergent channel to a gas outlet; and a liquid flow path from a liquid inlet, to the first tray, through the injection port, to the convergent channel, through the divergent channel, to the second tray.

12. The mixing device of claim 1, wherein the plurality of mixers includes at least 2 mixers.

13. The mixing device of claim 1, wherein the injection ports of the plurality of mixers include at least two elongated apertures extending circumferentially though the first sidewall.

14. The mixing device of claim 1, wherein a ratio of a maximum transverse dimension of the outlet of the first portion to a maximum transverse dimension of the inlet of the first portion is between 0.4 and 0.7.

* * * * *